US012301886B2

United States Patent
Lai et al.

(10) Patent No.: US 12,301,886 B2
(45) Date of Patent: May 13, 2025

(54) METHOD AND APPARATUS FOR ADAPTIVE LOOP FILTERING AT PICTURE AND SUB-PICTURE BOUNDARY IN VIDEO CODING

(71) Applicant: HFI Innovation Inc., Zhubei (TW)

(72) Inventors: Chen-Yen Lai, Hsinchu (TW); Ching-Yeh Chen, Hsinchu (TW); Tzu-Der Chuang, Hsinchu (TW); Lulin Chen, San Jose, CA (US)

(73) Assignee: HFI INNOVATION INC., Zhubei (TW)

( * ) Notice: Subject to any disclaimer, the term of this patent is extended or adjusted under 35 U.S.C. 154(b) by 133 days.

(21) Appl. No.: 17/636,935

(22) PCT Filed: Sep. 2, 2020

(86) PCT No.: PCT/US2020/049015
§ 371 (c)(1),
(2) Date: Feb. 21, 2022

(87) PCT Pub. No.: WO2021/046096
PCT Pub. Date: Mar. 11, 2021

(65) Prior Publication Data
US 2022/0303587 A1 Sep. 22, 2022

Related U.S. Application Data

(60) Provisional application No. 62/903,043, filed on Sep. 20, 2019, provisional application No. 62/896,631, (Continued)

(51) Int. Cl.
*H04N 19/82* (2014.01)
*H04N 19/117* (2014.01)
(Continued)

(52) U.S. Cl.
CPC .......... *H04N 19/82* (2014.11); *H04N 19/117* (2014.11); *H04N 19/182* (2014.11); *H04N 19/96* (2014.11)

(58) Field of Classification Search
None
See application file for complete search history.

(56) References Cited

U.S. PATENT DOCUMENTS

2013/0114735 A1  5/2013  Wang
2013/0272624 A1  10/2013 Budagavi
(Continued)

FOREIGN PATENT DOCUMENTS

| CN | 103503456 A | 1/2014 |
| CN | 104160702 A | 11/2014 |
| WO | 2018/191224 A1 | 10/2018 |

OTHER PUBLICATIONS

International Search Report and Written Opinion dated Feb. 2, 2021, issued in application No. PCT/US2020/049015.
(Continued)

*Primary Examiner* — Samuel D Fereja
(74) *Attorney, Agent, or Firm* — McClure, Qualey & Rodack, LLP (57) ABSTRACT

Methods and apparatus for video coding using Adaptive Loop Filter (ALF) processing are disclosed. According to one method, the ALF virtual boundary processing is always applied to the bottom CTU row regardless whether the bottom CTU row is for a picture or a sub-picture. In another method, the ALF padding process is unified for different boundary types belonging to the target boundary belongs to a boundary-type group comprising two or more of slice boundary, tile boundary, VR360 face boundary, and sub-picture boundary. In yet another method, the ALF VB (Continued)

processing has a fixed priority for a corner region that both horizontal and vertical virtual boundaries can be applied.

5 Claims, 7 Drawing Sheets

Related U.S. Application Data filed on Sep. 6, 2019, provisional application No. 62/896,032, filed on Sep. 5, 2019.

(51) Int. Cl.
*H04N 19/182* (2014.01)
*H04N 19/96* (2014.01)

(56) References Cited

U.S. PATENT DOCUMENTS

| | | | |
|---|---|---|---|
| 2015/0103900 A1 | 4/2015 | Liu et al. | |
| 2017/0195670 A1* | 7/2017 | Budagavi | H04N 19/82 |
| 2022/0394248 A1* | 12/2022 | Deng | H04N 19/14 |
| 2023/0231998 A1* | 7/2023 | Zhang | H04N 19/167 |
| | | | 375/240.29 |

OTHER PUBLICATIONS

Chinese language Notice of Allowance dated Sep. 7, 2021, issued in application No. TW 109130197.

Extended European Search Report dated Aug. 4, 2023, issued in application No. EP 20861494.1.

Lai, C-Y., et al.; "CE5-related: Align ALF padding processes at picture and subpicture boundaries;" Joint Video Experts Team (JVET) of ITU-T SG 16 WP 3 and ISO/IEC JTC 1/SC 29/WG 11; Oct. 2019; pp. 1-21.

Lai, C-Y., et al.; "CE5-related: Align ALF virtual boundary processes in the bottom CTU rows of one picture and one subpicture;" Joint Video Experts Team (JVET) of ITU-T SG 16 WP 3 and ISO/IEC JTC 1/SC 29/WG 11; Oct. 2019; pp. 1-6.

Hu, N., et al.; "AHG12/Non-CE5: Unification of boundary handling for adaptive loop filter;" Joint Video Experts Team (JVET) of ITU-T SG 16 WP 3 and ISO/IEC JTC 1/SC 29/WG 11; Jun. 2019; pp. 1-13.

Liu, H., et al.; "Non-CE5: Unified padding method for samples at variant boundaries in ALF;" Joint Video Experts Team (JVET) of ITU-T SG 16 WP 3 and ISO/IEC JTC 1/SC 29/WG 11; Jul. 2019; pp. 1-4.

Chinese language office action dated Nov. 30, 2024, issued in application No. CN 202080062450.7.

\* cited by examiner

METHOD AND APPARATUS FOR ADAPTIVE LOOP FILTERING AT PICTURE AND SUB-PICTURE BOUNDARY IN VIDEO CODING

CROSS REFERENCE TO RELATED APPLICATIONS

The present invention claims priority to U.S. Provisional Patent Application, Ser. No. 62/896,032, filed Sep. 5, 2019, U.S. Provisional Patent Application, Ser. No. 62/896,631, filed Sep. 6, 2019 and U.S. Provisional Patent Application, Ser. No. 62/903,043, filed Sep. 20, 2019. The U.S. Provisional Patent Applications are hereby incorporated by reference in their entireties.

FIELD OF THE INVENTION

The present invention relates to adaptive loop filter (ALF) processing in a video coding system. In particular, the present invention relates to ALF processing at picture boundary and sub-picture boundary in a video encoder or decoder.

BACKGROUND

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artefacts are introduced, particularly in the quantization process. In order to alleviate the coding artefacts, additional processing has been applied to reconstructed video to enhance picture quality in newer coding systems. The additional processing is often configured in an in-loop operation so that the encoder and decoder may derive the same reference pictures to achieve improved system performance.

Figure 1A:
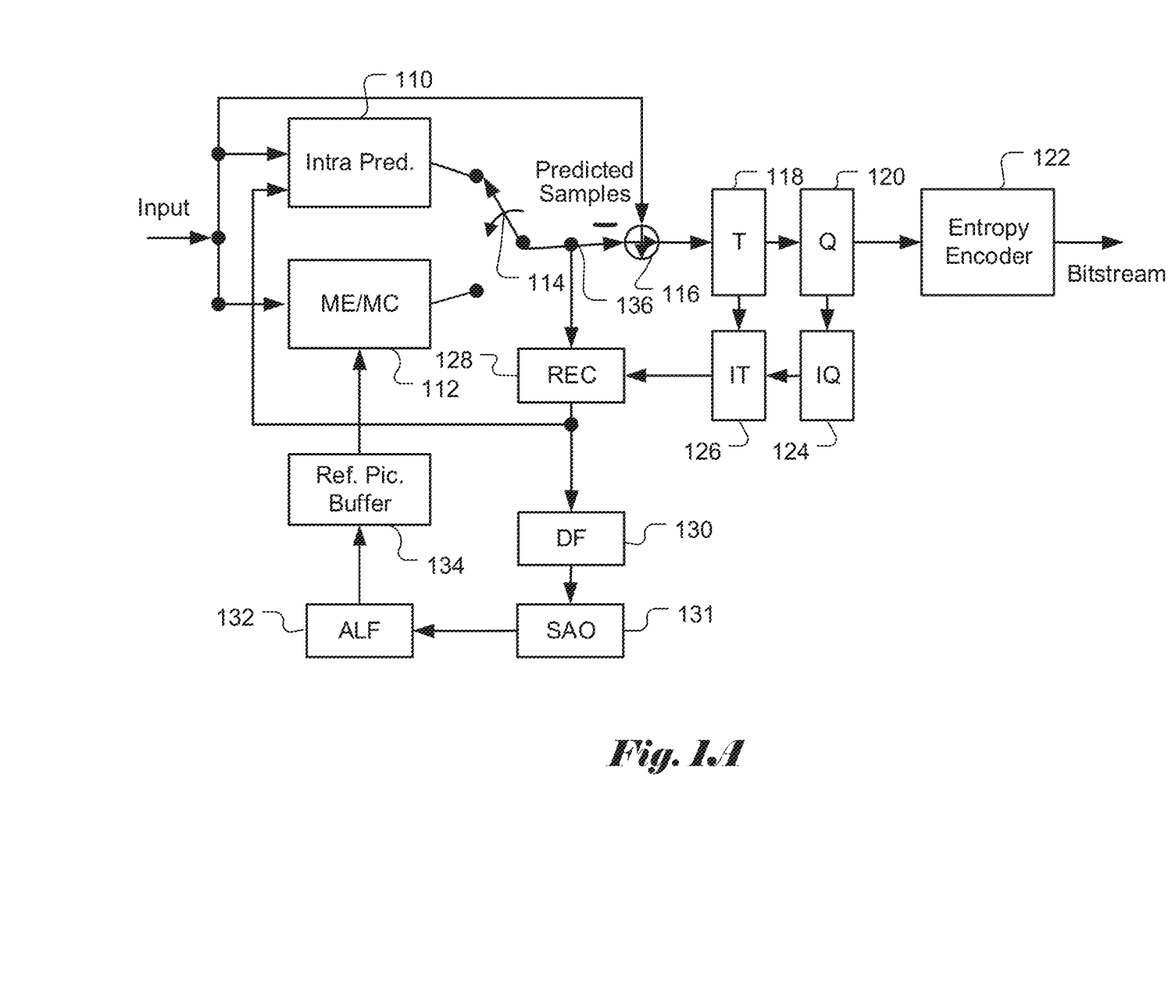
FIG. 1A illustrates an exemplary adaptive inter/intra video encoding system incorporating DF, SAO and ALF in-loop processing.

FIG. 1A illustrates an exemplary adaptive Inter/Intra video coding system incorporating in-loop processing including adaptive loop filter (ALF). For Inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In video coding systems, various in-loop filters such as Deblocking Filter (DF) 130, Sample Adaptive Offset (SAO) 131 and Adaptive Loop Filter (ALF) 132 have been used to enhance picture quality.

Figure 1B:
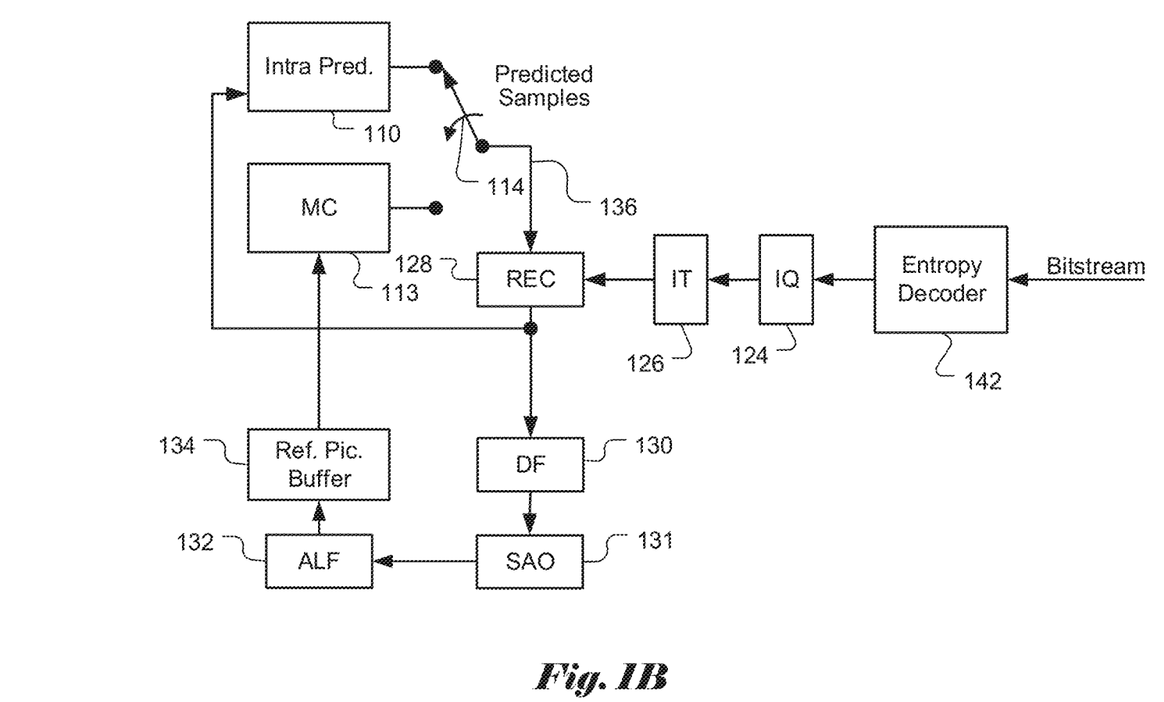
FIG. 1B illustrates an exemplary adaptive inter/intra video decoding system incorporating DF, SAO and ALF in-loop processing.

A corresponding decoder for the encoder of FIG. 1A is shown in FIG. 1B. The video bitstream is decoded by Entropy Decoder 142 to recover the transformed and quantized residues. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

In the emerging coding standard under development (named Versatile Video Coding, VVC), the coding tree block (CTB) based ALF scheme has been proposed in JVET-K0382 (M. Karczewicz, et al., "CE2-related: CTU Based Adaptive Loop Filtering", Joint Video Experts Team (JVET) of ITU-T SG 16 WP 3 and ISO/IEC JTC 1/SC 29/WG 11, 11th Meeting: Ljubljana, S I, 10-18 Jul. 2018, Document: JVET-K0382), JVET-L0391 (N. Hu, et al., "CE2.3 and CE2.4: Fixed filters, temporal filters, CU-level control and low-latency encoder for ALF", Joint Video Experts Team (JVET) of ITU-T SG 16 WP 3 and ISO/IEC JTC 1/SC 29/WG 11, 12th Meeting: Macao, C N, 3-12 Oct. 2018, Document: JVET-L0391) and JVET-M0429 (N. Hu, et al., "Coding tree block based adaptive loop filter", Joint Video Experts Team (JVET) of ITU-T SG 16 WP 3 and ISO/IEC JTC 1/SC 29/WG 11, 13th Meeting: Marrakech, M A, 9-18 Jan. 2019, Document: JVET-M0429). Adaptive parameter set (APS) has been adopted in VTM4 (J. Chen, et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, 13th Meeting: Marrakech, M A, 9-18 Jan. 2019, Document: JVET-M1002). Each APS contains one set of signalled ALF filters, up to 32 APSs are supported. A tile group can re-use the ALF information from an APS to reduce the overhead. The APSs are updated as a first-in-first-out (FIFO) buffer. In CTB based ALF, for luma component, when ALF is applied to a luma CTB, the choice among 5 temporal or 1 signaled filter sets is indicated. Only the filter set index is signalled. For one slice, only one new set of 25 filters can be signaled. If a new set is signalled for a slice, all the luma CTBs in the same slice share the same set. For the chroma component, when ALF is applied to a chroma CTB, if a new filter is signalled for a slice, the CTB uses the new filter, otherwise, the most recent temporal chroma filter satisfying the temporal scalability constraint is applied. As the slice-level temporal filter, the APSs are updated as a first-in-first-out (FIFO) buffer.

Figure 2:
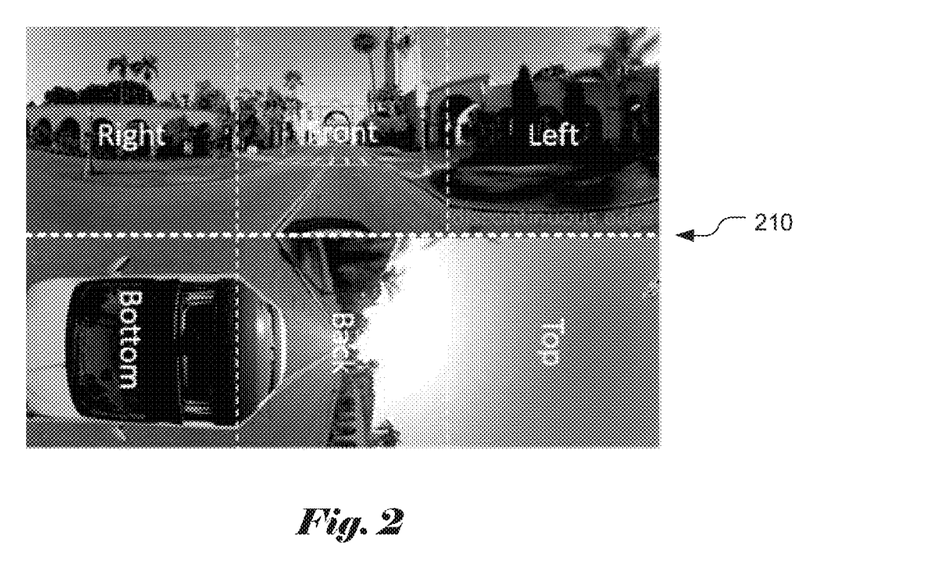
FIG. 2 illustrates an example of a picture in the 3×2 frame packing configuration, where the three faces in the top half are continuous in the 3D geometry, the three faces in the bottom half are also continuous in the 3D geometry. However, the boundary between the top three faces and the bottom three faces are discontinuous.

For a 360° video, the layout for a specific projection format may have one or more discontinuous edges. Applying the in-loop filters on these discontinuous edges directly may result in poor visual quality and decrease coding efficiency because the accessed pixels (to be referenced and/or filtered) across discontinuous edges are jointly processed (filtered). For projection formats including a plurality of faces, discontinuities appear between two or more adjacent faces in the frame packed picture regardless of what kind of compact frame packing arrangement is used. For example, FIG. 2 illustrates an example of a picture in the 3×2 frame packing configuration, where the three faces in the top half are continuous in the 3D geometry, and the three faces in the bottom half are also continuous in the 3D geometry. However, the edge 210 between the top and bottom halves of the frame packed picture is discontinuous in the 3D geometry. If in-loop filtering operations are performed across this discontinuity, face seam artifacts may become visible in the reconstructed video. In JVET-N0438 (S Y Lin, et al., "AHG12: Loop filter disabled across virtual boundaries", Joint Video Experts Team (JVET) of ITU-T SG 16 WP 3 and ISO/IEC JTC 1/SC 29/WG 11, 14th Meeting: Geneva, CH, 19-27 March 2019, Document: JVET-N0438), proposed method to disable the in-loop filters across vertical and/or horizontal virtual boundaries in the picture is disclosed.

In JVET-N0088 (C Y Chen, et al., "CE5-1: Adaptive loop filter with virtual boundary processing", Joint Video Experts Team (JVET) of ITU-T SG 16 WP 3 and ISO/IEC JTC 1/SC 29/WG 11, 14th Meeting: Geneva, C H, 19-27 Mar. 2019, Document: JVET-N0088), ALF with virtual boundaries (VBs) are used to remove the required line buffer for adaptive loop filter (ALF). For the ALF of VTM4.0, seven luma line buffers and four chroma line buffers are required since 7×7 diamond filters with 4×4 block-based classification are used for the luma component and 5×5 diamond filters are used for the chroma component. In order to totally remove the line buffer requirement, ALF with virtual boundary (VB) processing is proposed as follows: when one sample located at one side of a VB is filtered, accessing samples located at the other side of the VB is forbidden. The originally required samples at the other side of the VB are replaced with padded samples.

Figure 3:
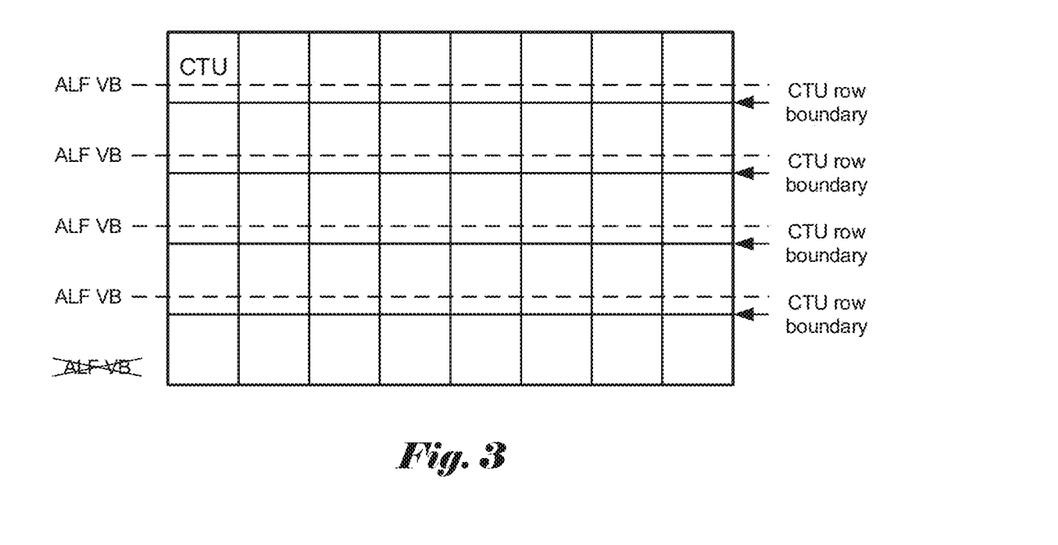
FIG. 3 illustrates an example of CTU row based virtual boundary for ALF.
Figure 4A:
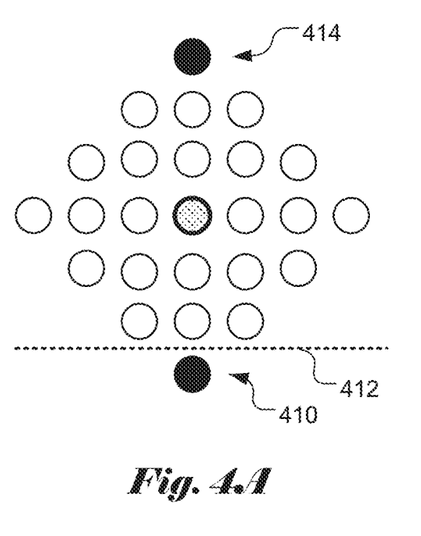
FIG. 4A and FIG. 4B illustrate two examples of padding for ALF processing across a virtual boundary.
Figure 4B:
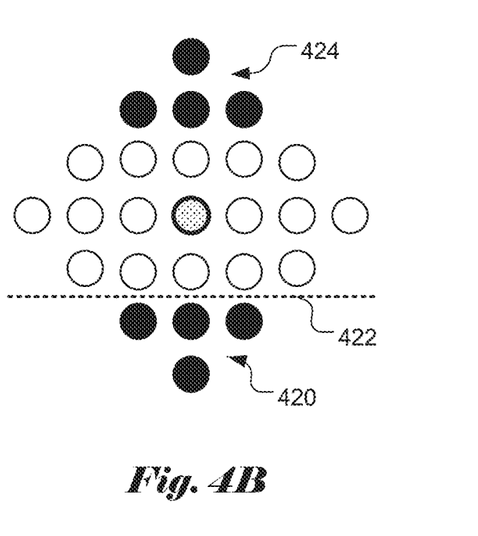
Figure 4C:
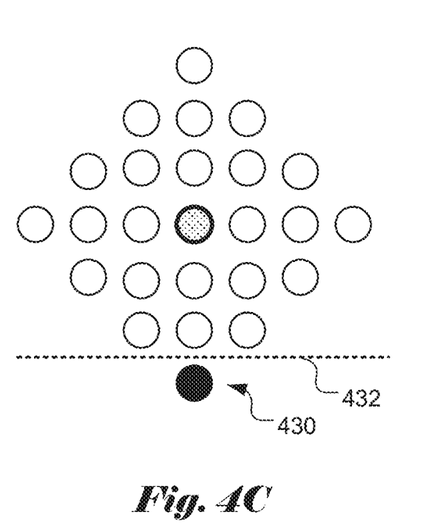
FIG. 4C and FIG. 4D illustrate two examples of padding for ALF processing across a picture boundary.
Figure 4D:
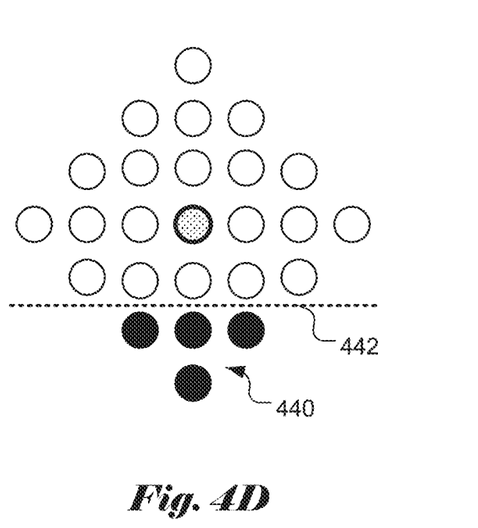

FIG. 3 illustrates an example of CTU row based virtual boundary for ALF. In FIG. 3, each small block corresponds to one CTU. The CTU row boundaries are indicated by the arrows. The ALF VBs are shown as dashed lines, where each ALF VB is located above a corresponding CTU row boundary. When ALF VB processing is enabled, an unavailable sample and the sample at its symmetric location of the ALF are padded. FIG. 4A and FIG. 4B illustrate two examples of padding for ALF VB. In these examples, the ALF has a 7×7 diamond-shaped footprint. In FIG. 4A, the bottom sample shown as a black circle 410 is outside the VB 412. Not only this unavailable sample, but also the sample at its symmetric location 414 of the ALF footprint is padded. In FIG. 4B, the bottom 4 samples shown as black circles 420 are outside the VB 422. Not only these unavailable samples, but also the samples at symmetric locations 424 of the ALF footprint are padded. FIG. 4C and FIG. 4D illustrate two examples of padding for ALF across a picture boundary. In FIG. 4C, the bottom sample shown as a black circle 430 is outside the picture boundary 432. Only this unavailable sample is padded. In FIG. 4D, the bottom 4 samples shown as black circles 440 are outside the picture boundary 442. Only these unavailable samples are padded.

In VTM3.0 (VVC (Versatile Video Coding) Test Model Ver. 3.0), the filtering process of the Adaptive Loop Filter, is performed as follows:

$$O(x,y)=\Sigma_{(i,j)} w(i,j) \cdot I(x+i, y+j), \quad (1)$$

In the above equation, samples I(x+i,y+j) are input samples, O(x,y) is the filtered output sample (i.e. filter result), and w(i,j) denotes the filter coefficients. Since the ALF is applied to the reconstructed samples, samples I(x+i,y+j) correspond to reconstructed samples. The center reconstructed pixel at a center location of the ALF processing corresponds to (i,j)=(0, 0), i.e., I(i,j). In practice, in VTM3.0, it is implemented using integer arithmetic for fixed point precision computations:

$$O(x, y) = \left( \sum_{i=-\frac{L}{2}}^{\frac{L}{2}} \sum_{j=-\frac{L}{2}}^{\frac{L}{2}} w(i, j) \cdot I(x + i, y + j) + 64 \right) \gg 7, \quad (2)$$

In the above equation, L denotes the filter length, and where w(i,j) are the filter coefficients in fixed point precision.

Equation (1) can be reformulated, without coding efficiency impact, in the following expression:

$$O(x,y)=I(x,y)+\Sigma_{(i,j)\neq(0,0)} w(i,j) \cdot (I(x+i,y+j)-I(x,y)), \quad (3)$$

In the above equation, w(i,j) are the same filter coefficients as in equation (1) except for w(0, 0), which is equal to 1 in equation (3) while it is equal to $(1-\Sigma_{(i,j)\neq(0,0)} w(i,j))$ in equation (1).

Using the above filter formula of equation (3), we can easily introduce nonlinearity to make ALF more efficient by using a simple clipping function to reduce the impact of neighbor sample values (I(x+i,y+j)) when they are very different from the current sample value (I(x,y)) being filtered.

In JVET-M0385 ((J. Taquet, et al., "*Non-Linear Adaptive Loop Filter*", in Joint Video Exploration Team (JVET) of ITU-T SG 16 WP 3 and ISO/IEC JTC 1/SC 29/WG 11, 13th Meeting: Marrakech, M A, 9-18 Jan. 2019, Document: JVET-M0385)), a non-linear ALF is disclosed. It introduces an adaptive clipping operation on the input samples values of the Adaptive Loop Filter in test software VTM3.0. The goal of this adaptive clipping is to introduce some nonlinearities to limit the difference between the input sample value to be filtered and the other neighbor input sample values of the filter.

According to JVET-M0385, the ALF filter operation is modified as follows:

$$O'(x,y)=I(x,y)+\Sigma_{(i,j)\neq(0,0)} w(i,j) \cdot K(I(x+i,y+j)-I(x,y),k(i,j)), \quad (4)$$

In the above equation, O'(x,y) corresponds to the modified ALF filter output, I(x,y) corresponds to sample before ALF, K(d,b)=min(b, max(−b,d)) is the clipping function, and k(i,j) are clipping parameters, which depends on filter coefficient at the (i,j). The encoder performs the optimization to find the best k(i,j). As shown in equation (4), the clipping function is applied to the difference, (I(x+i,y+j)−I(x,y)), which corresponds to the difference between an off-center reconstructed pixel (i.e., I(x+i,y+j), (i,j)≠(0,0)) and the center reconstructed pixel of the ALF (i.e., I(x,y)). According to equation (4), the difference, (I(x+i,y+j)−I(x,y)) is clipped by the clipping function with k(i,j) clipping parameters. The term, K(I(x+i,y+j)−I(x,y),k(i,j)) is referred as a clipped difference in this disclosure. In other words, the modified ALF output, O'(x,y) includes a weighted sum of clipped differences (i.e., $\Sigma_{(i,j)\neq(0,0)}w(i,j)\cdot K(I(x+i,y+j)-I(x,y),k(i,j)))$. As shown in equation (4), the weighted sums of the difference between a non-center filter location and the center reconstructed pixel, $(I(x+i,y+j)-I(x,y))$, is modified to a new term, $K(I(x+i,y+j)-I(x,y),k(i,j))$. The term $(I(x+i,y+j)-I(x,y))$ is referred as the original difference between a non-center filter location and the center reconstructed pixel.

In the implementation according to JVET-M0385, the clipping parameters $k(i,j)$ are specified for each ALF filter, where one clipping value is signaled per filter coefficient. It means that 12 clipping values are signaled in the bitstream per Luma filter and 6 clipping values for the Chroma filter.

In order to limit the signaling cost and the encoder complexity, the clipping values are limited to a small set of possible values in JVET-M0385. Furthermore, only 4 possible values are used for Inter slices and 3 possible values are used for Intra slices.

Because the variance of the local differences is often higher for Luma than for Chroma, two different sets are used for the Luma and Chroma filters. Furthermore, the maximum sample value is included in each set, so that clipping can be disabled if it is not necessary.

The proposed sets of clipping values according to JVET-M0385 are provided in

TABLE 1:

| | Allowed clipping values | |
|---|---|---|
| | INTRA | INTER |
| LUMA | {10, 102, 1024} | {6, 32, 181, 1024} |
| CHROMA | {4, 24, 1024} | {4, 25, 161, 1024} |

The clipping values are encoded in the slice header using a Golomb encoding corresponding to the index of the clipping value in the set.

The clipping values are encoded in the slice header using a k-th exponential-Golomb code corresponding to the index of the clipping value in the set.

In VVC Draft 6 (B. Bross, et al., "Versatile Video Coding (Draft 6)", Joint Video Experts Team (JVET) of ITU-T SG 16 WP 3 and ISO/IEC JTC 1/SC 29/WG 11, 15th Meeting: Gothenburg, S E, 3-12 Jul. 2019, Document: JVET-O2001), the sub-picture information is signalled in the SPS as shown below. In the syntax table, flag subpics_present_flag is signaled, where subpics_present_flag equal to 1 indicates that sub-picture parameters are present in the present in the SPS RBSP syntax.

7.3.2.3 Sequence Parameter Set RBSP Syntax

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_max_in_luma_samples | ue(v) |
|   pic_height_max_in_luma_samples | ue(v) |
|   subpics_present_flag | u(1) |

-continued

| | Descriptor |
|---|---|
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   } | |
|   bit_depth_luma_minus8 | ue(v) |
|   bit_depth_chroma_minus8 | ue(v) |
| ... | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

In JVET-O2001, 8.8.5.5 clause in the draft specifies the ALF boundary position derivation process. The 8.8.5.5 clause is shown below:

8.8.5.5 ALF Boundary Position Derivation Process
Inputs of this process are:
  a luma location (xCtb, yCtb) specifying the top-left sample of the current luma coding tree block relative to the top left sample of the current picture,
  a luma location (x,y) specifying the current sample relative to the top-left sample of the current luma coding tree block.

Output of this process are:
  the left vertical boundary position clipLeftPos,
  the right vertical boundary position clipRightPos,
  the above horizontal boundary position clipTopPos,
  the below horizontal boundary position clipBottomPos.

The variables clipLeftPos, clipRightPos, clipTopPos and clipBottomPos are set equal to −128.

The variable clipTopPos is modified as follows:
  If the bottom boundary of the current coding tree block is not the bottom boundary of the picture and y−(CtbSizeY−4) is greater than or equal to 0, the variable clipTopPos is set equal to yCtb+CtbSizeY−4.
  Otherwise, if pps_loop_filter_across_virtual_boundaries_disabled_flag is equal to 1, and PpsVirtualBoundariesPosY[n]% CtbSizeY is equal to 0, and yCtb+y−PpsVirtualBoundariesPosY[n] is greater than or equal to 0 and less than 3 for any n=0 . . . pps_num_hor_virtual_boundaries−1, the following applies:

clipTopPos=PpsVirtualBoundariesPosY[n]     (8-1292)

Otherwise, if y is less than 3, and the top boundary of the current coding tree block is not the top boundary of the picture, and one or more of the following conditions are true, the variable clipTopPos is set equal to yCtb:
    If the top boundary of the current coding tree block is the top boundary of the brick, and loop_filter_across_bricks_enabled_flag is equal to 0.
    If the top boundary of the current coding tree block is the top boundary of the slice, and loop_filter_across_slices_enabled_flag is equal to 0.
    If the top boundary of the current coding tree block is the top boundary of the sub-picture, and loop_filter_across_subpic_enabled_flag[SubPicIdx] is equal to 0.

The variable clipBottomPos is modified as follows:
  If the bottom boundary of the current coding tree block is not the bottom boundary of the picture and CtbSizeY−4−y is greater than 0 and is less than 4, the variable clipBottomPos is set equal to yCtb+CtbSizeY−4.
  Otherwise, if pps_loop_filter_across_virtual_boundaries_disabled_flag is equal to 1, PpsVirtualBoundariesPosY[n] % CtbSizeY is equal to 0, PpsVirtualBoundariesPosY[n] is not equal to pic_height_in_luma_samples−1 or 0, and PpsVirtualBoundariesPosY[n]−yCtb−y is greater than 0 and less than 4 for any n=0 . . . pps_num_hor_virtual_boundaries−1, the following applies:

clipBottomPos=PpsVirtualBoundariesPosY[n]          (8-1293)

Otherwise, if CtbSizeY−y is less than 4, and the bottom boundary of the current coding tree block is not the bottom boundary of the picture, and one or more of the following conditions are true, the variable clipBottomPos is set equal to yCtb+CtbSizeY:
    If the bottom boundary of the current coding tree block is the bottom boundary of the brick, and loop_filter_across_bricks_enabled_flag is equal to 0.
    If the bottom boundary of the current coding tree block is the bottom boundary of the slice, and loop_filter_across_slices_enabled_flag is equal to 0.
    If the bottom boundary of the current coding tree block is the bottom boundary of the sub-picture, and loop_filter_across_subpic_enabled_flag[SubPicIdx] is equal to 0.
The variable clipLeftPos is modified as follows:
  If pps_loop_filter_across_virtual_boundaries_disabled_flag is equal to 1, and PpsVirtualBoundariesPosX[n]% CtbSizeY is equal to 0, and xCtb+x−PpsVirtualBoundariesPosX[n] is greater than or equal to 0 and less than 3 for any n=0 . . . pps_num_ver_virtual_boundaries−1, the following applies:

clipLeftPos=PpsVirtualBoundariesPosX[n]          (8-1294)

Otherwise, if x is less than 3, the left boundary of the current coding tree block is not the left boundary of the picture and one or more of the following conditions are true, the variable clipLeftPos is set equal to xCtb:
    If the left boundary of the current coding tree block is the left boundary of the brick, and loop_filter_across_bricks_enabled_flag is equal to 0.
    If the left boundary of the current coding tree block is the left boundary of the slice, and loop_filter_across_slices_enabled_flag is equal to 0.
    If the left boundary of the current coding tree block is the left boundary of the sub-picture, and loop_filter_across_subpic_enabled_flag[SubPicIdx] is equal to 0.
The variable clipRightPos is modified as follows:
  If pps_loop_filter_across_virtual_boundaries_disabled_flag is equal to 1, and PpsVirtualBoundariesPosX[n] % CtbSizeY is equal to 0, and PpsVirtualBoundariesPosX[n]−xCtb−x is greater than 0 and less than 4 for any n=0 . . . pps_num_ver_virtual_boundaries−1, the following applies:

clipRightPos=PpsVirtualBoundariesPosX[n]          (8-1295)

Otherwise, if CtbSizeY−x is less than 4, and the right boundary of the current coding tree block is not the right boundary of the picture, and one or more of the following conditions are true, the variable clipRightPos is set equal to xCtb+CtbSizeY:
    If the right boundary of the current coding tree block is the right boundary of the brick, and loop_filter_across_bricks_enabled_flag is equal to 0.
    If the right boundary of the current coding tree block is the right boundary of the slice, and loop_filter_across_slices_enabled_flag is equal to 0.
    if the right boundary of the current coding tree block is the right boundary of the sub-picture, and loop_filter_across_subpic_enabled_flag[SubPicIdx] is equal to 0.

BRIEF SUMMARY OF THE INVENTION

A method and apparatus for video coding are disclosed. According to this method, reconstructed pixels associated with a target sub-picture in a current picture are received, wherein the current picture is divided into one or more sub-pictures. If current picture height is a multiple of CTU (coding tree unit) row height: ALF VB (virtual boundary) processing is applied to a target CTU row in case that the target CTU row is a bottom CTU row of the target sub-picture and in case that the target CTU row is the bottom CTU row of the current picture, where one or more reconstructed samples in an ALF footprint outside a virtual boundary of the target CTU row and one or more corresponding reconstructed samples at symmetric locations of the ALF footprint are padded for the ALF VB processing.

The ALF VB processing can be applied to the reconstructed pixels at an encoder side and/or at the decoder side. In one embodiment, one flag is used for the target sub-picture to indicate whether the target sub-picture is enabled to be treated as one picture in a decoding process.

According to another method, ALF processing is applied to the reconstructed pixels, wherein if one or more reconstructed samples required for the ALF processing are outside a target boundary, said one or more reconstructed samples are padded using repetitive padding for the ALF processing, and wherein the target boundary belongs to a boundary-type group comprising two or more of slice boundary, tile boundary, VR360 face boundary, and sub-picture boundary. One flag can be used for the target boundary to indicate whether the using repetitive padding is enabled for the ALF processing at the target boundary.

According to yet another method, whether one or more target pixels in a region required for Adaptive Loop Filter (ALF) processing of a current block are outside a horizontal virtual boundary and a vertical virtual boundary of the current block are determined. If said one or more target pixels in the region required for the ALF processing of the current block are outside the horizontal virtual boundary and the vertical virtual boundary of the current block, the ALF processing is applied to the current block with higher priority in one of the horizontal virtual boundary and the vertical virtual boundary of the current block than one other of the horizontal virtual boundary and the vertical virtual boundary of the current block. In one embodiment, the horizontal virtual boundary has higher priority than the vertical virtual boundary of the current block. In another embodiment, the vertical virtual boundary has higher priority than the horizontal virtual boundary of the current block.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Method 1: Using APS ID Instead of the Index in APS FIFO for ALF with Temporal Filter In JVET-M0429, the selected temporal filter is signaled by using the index in APS FIFO, instead of using the APS ID in APS. This will restrict the possibility or the combination of using the coded APS for the current tile group. Also, it may introduce some error propagation when APS is missed or sent in duplication. In order to avoid these issues, the use of APS ID to indicate the selection of temporal filters for ALF is proposed instead of using the index in APS FIFO according to one embodiment. In another embodiment, this concept can be used in CTB-based ALF. When multiple temporal filters are allowed and switched at a certain level (e.g. CTB level), the APS IDs of temporal filters used in current tile group are signaled.

Method 2: Treating Discontinuous Edges as Virtual Boundaries

In JVET-N0088, ALF with virtual boundaries is proposed to avoid using the samples across the virtual boundaries in order to reduce the line buffer usage. In JVET-M0438, the discontinuous edges due to different faces in 360 videos are signaled, and the in-loop filtering process is disabled at these edges to avoid using uncorrelated samples to do filtering. Combined these two techniques, we propose a method to treat these discontinuous edges as virtual boundaries in ALF with VB process, instead of disabling the in-loop filtering process. In other words, we still apply in-loop filtering to those samples near the discontinuous edges instead of disabling in-loop filtering for these samples; however we also enable the virtual boundaries process in JVET-N0088 to avoid using uncorrelated samples at the other side of virtual boundary in the in-loop filtering process. In another embodiment, the virtual boundaries process proposed in JVET-N0088 is extended to the column directions. Moreover, in some cases, there are some sub-pictures in high resolution video. The sub-picture boundaries can be also treated as virtual boundaries in JVET-N0088 and we apply virtual boundaries process to those samples near these boundaries.

In another embodiment, when both of horizontal and vertical ALF VB processes can be applied, ALF with VB process applied to horizontal virtual boundaries has higher priority than ALF with VB process applied to vertical virtual boundaries. For example, for a 4×4 block in ALF process, only the top-left region is not available and ALF with VB process is required. We apply ALF with VB process to horizontal virtual boundaries (i.e. padding in the vertical direction) instead of applying ALF with VB process to vertical virtual boundaries (i.e. padding in the horizontal direction). In another embodiment, when both of horizontal and vertical ALF VB processes can be applied, ALF with VB process applied to horizontal virtual boundaries has lower priority than ALF with VB process applied to vertical virtual boundaries.

In another embodiment, if one of top-left, top, and top-right regions is not available for one to-be-processed 4×4 block, then ALF with VB process is applied to top boundary of this 4×4 blocks. If one of bottom-left, bottom, and bottom-right regions is not available for one to-be-processed 4×4 block, then ALF with VB process is applied to bottom boundary of this 4×4 blocks. Furthermore, in another case, if one of left and right regions is also not available, then ALF is disabled for this 4×4 block. In another case, if one of left and right regions is not available and one of top and bottom regions is not available, then ALF is disabled for this 4×4 block. In another case, if at least N of left, right, top and bottom regions are not available, then ALF are disabled for this 4×4 block, where N is an integer greater than or equal to 0 (e.g. N=2). In another case, if at least N of left, right, top, bottom, top-left, top-right, bottom-left and bottom right regions are not available, then ALF is disabled for this 4×4 block, where N is one integer greater than or equal to 0 (e.g. N=2).

In another embodiment, if one of top-left, left, and bottom-left regions is not available for one to-be-processed 4×4 block, then ALF with VB process is applied to left boundary of this 4×4 blocks. If one of top-right, right, and bottom-right regions is not available for one to-be-processed 4×4 block, then ALF with VB process is applied to right boundary of this 4×4 blocks.

In another embodiment, the boundaries mentioned in the above can be one of slice/tile/brick/sub-picture/360 virtual boundaries.

In another embodiment, the 4×4 block mentioned above can be one 4×4 block or one sample in the ALF process.

In another embodiment, ALF with VB process mentioned above can be replaced by one pre-defined padding method, e.g. repetitive padding, to avoid accessing those unavailable samples.

For example, in one embodiment, when both of horizontal and vertical ALF VB processes can be applied, the repetitive padding applied to horizontal boundaries has higher priority than the repetitive padding applied to vertical boundaries. For example, for one 4×4 block in ALF process, only the top-left region is not available and the repetitive padding is used to handle the unavailable samples. We apply the repetitive padding to horizontal boundaries (i.e. repetitive padding in the vertical direction) instead of applying the repetitive padding to vertical boundaries (i.e. repetitive padding in the horizontal direction). In another embodiment, when both of horizontal and vertical ALF VB processes can be applied, the repetitive padding applied to horizontal boundaries has lower priority than the repetitive padding applied to vertical boundaries.

In another embodiment, if one of top-left, top, and top-right regions is not available for one to-be-processed 4×4 block, then the repetitive padding is applied to the top boundary of this 4×4 blocks. If one of bottom-left, bottom, and bottom-right regions is not available for one to-be-processed 4×4 block, then the repetitive padding is applied to the bottom boundary of this 4×4 blocks.

In another embodiment, if one of top-left, left, and bottom-left regions is not available for one to-be-processed 4×4 block, then the repetitive padding is applied to left boundary of this 4×4 blocks. If one of top-right, right, and bottom-right regions is not available for one to-be-processed 4×4 block, then ALF with VB process is applied to the right boundary of this 4×4 blocks.

In another embodiment, if one of top-left, top, and top-right regions is not available for one to-be-processed 4×4 block, then ALF with VB process is applied to the top boundary of this 4×4 blocks. If one of bottom-left, bottom, and bottom-right regions is not available for one to-be-processed 4×4 block, then ALF with VB process is applied to the bottom boundary of this 4×4 blocks.

Any of the foregoing proposed methods can be implemented in encoders and/or decoders. For example, any of the proposed methods can be implemented in an in-loop filtering module or an entropy encoding module of an encoder and/or a decoder. Alternatively, any of the proposed methods can be implemented as a circuit coupled to in-loop filtering module or an entropy encoding module of the encoder and/or the decoder.

The related SPS (sequence parameter set) syntax table based on JVET-O2001-vE can be modified to support the above embodiment. An exemplary modified SPS syntax table is shown in Table 2.

TABLE 2

Modified SPS syntax table to support VB for sub-picture

```
seq_parameter_set_rbsp( ) {
    sps_decoding_parameter_set_id
    sps_video_parameter_set_id
    sps_max_sub_layers_minus1
    sps_reserved_zero_5bits
    profile_tier_level( sps_max_sub_layers_minus1 )
    gdr_enabled_flag
    sps_seq_parameter_set_id
    chroma_format_idc
    if( chroma_format_idc =v = 3 )
        separate_colour_plane_flag
    pic_width_max_in_luma_samples
    pic_height_max_in_luma_samples
    subpics_present_flag
    if( subpics_present_flag ) {
        max_subpics_minus1
        subpic_grid_col_width_minus1
        subpic_grid_row_height_minus1
        for( i = 0; i < NumSubPicGridRows; i++ )
            for( j = 0; j < NumSubPicGridCols; j++ )
                subpic_grid_idx[ I ][ j ]
        for( i = 0; i <= NumSubPics; i++ ) {
            subpic_treated_as_pic_flag[ i ]
            loop_filter_across_subpic_enabled_flag[ i ]
        }
    }
    ...
```

In the above syntax table, subpic_treated_as_pic_flag[i] equal to 1 specifies that the i-th sub-picture of each coded picture in the CVS (Coded Video Sequence) is treated as a picture in the decoding process excluding in-loop filtering operations. subpic_treated_as_pic_flag[i] equal to 0 specifies that the i-th sub-picture of each coded picture in the CVS is not treated as a picture in the decoding process excluding in-loop filtering operations. When not present, the value of subpic_treated_as_pic_flag[i] is inferred to be equal to 0.

In the above syntax table, loop_filter_across_subpic_enabled_flag[i] equal to 1 specifies that in-loop filtering operations may be performed across the boundaries of the i-th sub-picture in each coded picture in the CVS. loop_filter_across_subpic_enabled_flag[i] equal to 0 specifies that in-loop filtering operations are not performed across the boundaries of the i-th sub-picture in each coded picture in the CVS. When not present, the value of loop_filter_across_subpic_enabled_pic_flag[i] is inferred to be equal to 1.

Method 3: Signaling ALF for Sub-Pictures

Two flags in sequence parameter set, including subpic_treated_as_pic_flag and loop_filter_across_subpic_enabled_flag, are used to control the valid referred data region in VVC. subpic_treated_as_pic_flag[i] equal to 1 specifies that the i-th sub-picture of each coded picture in the CVS is treated as a picture in the decoding process excluding in-loop filtering operations. loop_filter_across_subpic_enabled_flag[i] equal to 1 specifies that in-loop filtering operations may be performed across the boundaries of the i-th sub-picture in each coded picture in the CVS. To clarify the definition of the allowed referred data region, some methods are proposed.

In one embodiment, the priority of subpic_treated_as_pic_flag[i] shall be higher than loop_filter_across_subpic_enabled_flag[i]. If subpic_treated_as_pic_flag[i] is equal to 1, loop_filter_across_subpic_enabled_flag[i] shall be inferred to be 0, and no need to be signaled. In this case, no referred data cross sub-picture boundary is allowed in the whole pictures. Only if subpic_treated_as_pic_flag[i] is equal to 0, loop_filter_across_subpic_enabled_flag[i] will be signaled to indicate whether the referred data for loop filters can cross sub-picture boundary or not. In another embodiment, if subpic_treated_as_pic_flag[i] is equal to 1, loop_filter_across_subpic_enabled_flag[i] is still signaled with a constraint that it shall be 0.

In VTM6, the repetitive padding is applied at a picture boundary to handle the unavailable data reference in ALF, where the boundary includes top, left, right, and bottom boundaries. However, in VTM6, when sub-picture is applied, the bitstream of each sub-picture needs to be well-decoded without referring the data of any other sub-picture if both subpic_treated_as_pic_flag and loop_filter_across_subpic_enabled_flag are enabled. In this case, for the sub-picture boundary, ALF virtual boundary (VB) process will be applied to deal with the unavailable data in ALF process. It is proposed to align the behaviors of ALF process in a sub-picture boundary and picture boundary.

In one embodiment, to align the behaviors of ALF process in a sub-picture boundary and picture boundary, ALF VB process is always applied to the bottom CTU rows in the picture when the picture height is a multiple of CTU height.

In another embodiment, ALF VB process will be disabled for the bottom CTU row in the sub-picture, when subpic_treated_as_pic_flag[i] is equal to 1.

In another embodiment, the repetitive padding is applied to the samples near sub-picture boundaries to handle the unavailable data, when subpic_treated_as_pic_flag[i] is equal to 1.

In another embodiment, the ALF VB process is applied to the samples at picture boundaries to handle the unavailable data, when picture boundary is also CTU boundary.

In the above methods, the condition of "subpic_treated_as_pic_flag[i] is equal to 1" is used to allow decoding the sub-picture bitstream without the information of relative sub-picture positions in one picture, so it can be replaced by other control flag. For example, it can be replaced by "loop_filter_across_subpic_enabled_flag[i] is equal to 0". Or it can be controlled by these two flags at the same time, e.g. "subpic_treated_as_pic_flag[i] is equal to 1" and "loop_filter_across_subpic_enabled_flag[i] is equal to 0".

Any of the foregoing proposed methods can be implemented in encoders and/or decoders. For example, any of the proposed methods can be implemented in an in-loop filtering module or an entropy encoding module of an encoder and/or a decoder. Alternatively, any of the proposed methods can be implemented as a circuit coupled to in-loop filtering module or an entropy encoding module of the encoder and/or the decoder.

According to another aspect of the present invention, the ALF loop filter process for the sub-picture case is disclosed when the i-th sub-picture is present with subpic_treated_as_pic_flag[i] equal to 1 or 0. In the case of subpic_treated_as_pic_flag[i] equal to 1, the sub-picture boundaries shall be treated as the picture boundaries. Thus all cases of the involved picture boundary condition check and processing shall include this sub-picture case. The proposed text changes are as follows (highlighted in bold text) for the luma and chroma sample location process in 8.8.5.2 and 8.8.5.4, and the boundary position derivation process in 8.8.5.5.

Modified 8.8.5.2 Coding Tree Block Filtering Process for Luma Samples

Inputs of this process are:
- a reconstructed luma picture sample array recPicture$_L$ prior to the adaptive loop filtering process,
- a filtered reconstructed luma picture sample array alfPicture$_L$,
- a luma location (xCtb, yCtb) specifying the top-left sample of the current luma coding tree block relative to the top left sample of the current picture.

Output of this process is the modified filtered reconstructed luma picture sample array alfPicture$_L$.

The derivation process for filter index clause 8.8.5.3 is invoked with the location (xCtb, yCtb) and the reconstructed luma picture sample array recPicture$_L$ as inputs, and filtIdx[x][y] and transposeIdx[x][y] with x, y=0 ... CtbSizeY−1 as outputs.

For the derivation of the filtered reconstructed luma samples alfPicture$_L$[x][y], each reconstructed luma sample inside the current luma coding tree block recPicture$_L$[x][y] is filtered as follows with x, y=0 ... CtbSizeY−1:

The array of luma filter coefficients f[j] and the array of luma clipping values c[j] corresponding to the filter specified by filtIdx[x][y] is derived as follows with j=0 ... 11:

If AlfCtbFiltSetIdxY[xCtb>>Ctb Log 2SizeY][yCtb>>Ctb Log 2SizeY] is less than 16, the following applies:

$$i = \text{AlfCtbFiltSetIdx}Y[x\text{Ctb}\!>\!>\!\text{Ctb Log 2Size}Y]\\ [y\text{Ctb}\!>\!>\!\text{Ctb Log 2Size}Y] \quad (8\text{-}1219)$$

$$f[j]=\text{AlfFixFiltCoeff}[\text{AlfClassToFiltMap}[i][\text{filtIdx}[x]\\ [y]]][j] \quad (8\text{-}1220)$$

$$c[j]=2^{BitdepthY} \quad (8\text{-}1221)$$

Otherwise (AlfCtbFiltSetIdxY[xCtb>>Ctb Log 2SizeY][yCtb>>Ctb Log 2SizeY] is greater than or equal to 16, the following applies:

$$i=\text{slice\_alf\_aps\_id\_luma}[\text{AlfCtbFiltSetIdx}Y\\ [x\text{Ctb}\!>\!>\!\text{Ctb Log 2Size}Y][y\text{Ctb}\!>\!>\!\text{Ctb Log}\\ 2\text{Size}Y]\text{-}16] \quad (8\text{-}1222)$$

$$f[j]=\text{AlfCoeff}_L[i][\text{filtIdx}[x][y]][j] \quad (8\text{-}1223)$$

$$c[j]=\text{AlfClip}_L[i][\text{filtIdx}[x][y]][j] \quad (8\text{-}1224)$$

The luma filter coefficients and clipping values index idx are derived depending on transposeIdx[x][y] as follows:

If transposeIndex[x][y] is equal to 1, the following applies:

$$\text{idx}[\ ]=\{9,4,10,8,1,5,11,7,3,0,2,6\} \quad (8\text{-}1225)$$

Otherwise, if transposeIndex[x][y] is equal to 2, the following applies:

$$\text{idx}[\ ]=\{0,3,2,1,8,7,6,5,4,9,10,11\} \quad (8\text{-}1226)$$

Otherwise, if transposeIndex[x][y] is equal to 3, the following applies:

$$\text{idx}[\ ]=\{9,8,10,4,3,7,11,5,1,0,2,6\} \quad (8\text{-}1227)$$

Otherwise, the following applies:

$$\text{idx}[\ ]=\{0,1,2,3,4,5,6,7,8,9,10,11\} \quad (8\text{-}1228)$$

The locations ($h_{x+i}$, $v_{y+j}$) for each of the corresponding luma samples (x,y) inside the given array recPicture of luma samples with i, j=−3.3 are derived as follows:

If subpic_treated_as_pic_flag[SubPicIdx] is equal to 1, the left boundary of the current coding tree block is the left boundary of the sub-picture, and x is greater than 0 and less than 3, the following applies:

$$h_{x+i}=\text{Clip3}(x\text{Ctb},\text{pic\_width\_in\_luma\_samples}-1,\\ x\text{Ctb}+x+i)$$

Otherwise, if subpic_treated_as_pic_flag[SubPicIdx] is equal to 1, the right boundary of the current coding tree block is the right boundary of the sub-picture, and x is greater than CtbSizeY−4, the following applies:

$$h_{x+i}=\text{Clip3}(0,x\text{Ctb}+\text{CtbSize}Y-1,x\text{Ctb}+x+i)$$

Otherwise, if pps_loop_filter_across_virtual_boundaries_disabled_flag is equal to 1, and PpsVirtualBoundariesPosX[n] % CtbSizeY is not equal to 0, and xCtb+x−PpsVirtualBoundariesPosX[n] is greater than or equal to 0 and less than 3 for any n=0 ... pps_num_ver_virtual_boundaries−1, the following applies:

$$h_{x+i}=\text{Clip3}(\text{PpsVirtualBoundariesPos}X[n],\\ \text{pic\_width\_in\_luma\_samples}-1,x\text{Ctb}+x+i) \quad (8\text{-}1229)$$

Otherwise, if pps_loop_filter_across_virtual_boundaries_disabled_flag is equal to 1, and PpsVirtualBoundariesPosX[n] % CtbSizeY is not equal to 0, and PpsVirtualBoundariesPosX[n]−xCtb−x is greater than 0 and less than 4 for any n=0 ... pps_num_ver_virtual_boundaries−1, the following applies:

$$h_{x+i}=\text{Clip3}(0,\text{PpsVirtualBoundariesPos}X[n]-1,x\text{Ctb}+\\ x+i) \quad (8\text{-}1230)$$

Otherwise, the following applies:

$$h_{x+i}=\text{Clip3}(0,\text{pic\_width\_in\_luma\_samples}-1,x\text{Ctb}+x+i) \quad (8\text{-}1231)$$

If subpic_treated_as_pic_flag[SubPicIdx] is equal to 1, the top boundary of the current coding tree block is the top boundary of the sub-picture, and y is greater than 0 and less than 3, the following applies:

$$v_{y+j}=\text{Clip3}(y\text{Ctb},\text{pic\_height\_in\_luma\_samples}-1,y\text{Ctb}+y+j)$$

Otherwise, if subpic_treated_as_pic_flag[SubPicIdx] is equal to 1, the bottom boundary of the current coding tree block is the bottom boundary of the sub-picture, and y is greater than CtbSizeY−4, the following applies:

$$v_{y+j}=\text{Clip3}(0,y\text{Ctb}+\text{CtbSize}Y-1,y\text{Ctb}+y+j)$$

Otherwise, if pps_loop_filter_across_virtual_boundaries_disabled_flag is equal to 1, and PpsVirtualBoundariesPosY[n] % CtbSizeY is not equal to 0, and yCtb+y−PpsVirtualBoundariesPosY[n] is greater than or equal to 0 and less than 3 for any n=0 . . . pps_num_hor_virtual_boundaries−1, the following applies:

$$v_{y+j}=\text{Clip3}(\text{PpsVirtualBoundariesPos}Y[n],\text{pic\_height\_in\_luma\_samples}-1,y\text{Ctb}+y+j) \quad (8\text{-}1232)$$

Otherwise, if pps_loop_filter_across_virtual_boundaries_disabled_flag is equal to 1, and PpsVirtualBoundariesPosY[n] % CtbSizeY is not equal to 0, and PpsVirtualBoundariesPosY[n]−yCtb−y is greater than 0 and less than 4 for any n=0 . . . pps_num_hor_virtual_boundaries−1, the following applies:

$$v_{y+j}=\text{Clip3}(0,\text{PpsVirtualBoundariesPos}Y[n]-1,y\text{Ctb}+y+j) \quad (8\text{-}1233)$$

Otherwise, the following applies:

$$v_{y+j}=\text{Clip3}(0,\text{pic\_height\_in\_luma\_samples}-1,y\text{Ctb}+y+j) \quad (8\text{-}1234)$$

Modified 8.8.5.4 Coding Tree Block Filtering Process for Chroma Samples

Inputs of this process are:
- a reconstructed chroma picture sample array recPicture prior to the adaptive loop filtering process,
- a filtered reconstructed chroma picture sample array alfPicture,
- a chroma location (xCtbC, yCtbC) specifying the top-left sample of the current chroma coding tree block relative to the top left sample of the current picture,
- an alternative chroma filter index altIdx.

Output of this process is the modified filtered reconstructed chroma picture sample array alfPicture. The width and height of the current chroma coding tree block ctbWidthC and ctbHeightC is derived as follows:

$$\text{ctbWidth}C=\text{CtbSize}Y/\text{SubWidth}C \quad (8\text{-}1278)$$

$$\text{ctbHeight}C=\text{CtbSize}Y/\text{SubHeight}C \quad (8\text{-}1279)$$

For the derivation of the filtered reconstructed chroma samples alfPicture[x][y], each reconstructed chroma sample inside the current chroma coding tree block recPicture[x][y] is filtered as follows with x=0 . . . ctbWidthC−1, y=0 . . . ctbHeightC−1:

The locations ($h_{x+i}$, $v_{y+j}$) for each of the corresponding chroma samples (x,y) inside the given array recPicture of chroma samples with i, j=−2 . . . 2 are derived as follows:

If subpic_treated_as_pic_flag[SubPicIdx] is equal to 1, the left boundary of the current coding tree block is the left boundary of the sub-picture, and x is greater than 0 and less than 2, the following applies:

$$h_{x+i}=\text{Clip3}(x\text{Ctb}C,\text{pic\_width\_in\_luma\_samples}/\text{SubWidth}C-1,x\text{Ctb}C+x+i)$$

Otherwise, if subpic_treated_as_pic_flag[SubPicIdx] is equal to 1, the right boundary of the current coding tree block is the right boundary of the sub-picture, and x is greater than CtbSizeY/SubWidthC−3, the following applies:

$$h_{x+i}=\text{Clip3}(0,x\text{Ctb}C+\text{CtbSize}Y/\text{SubWidth}C-1,x\text{Ctb}C+x+i)$$

Otherwise, if pps_loop_filter_across_virtual_boundaries_disabled_flag is equal to 1, and PpsVirtualBoundariesPosX[n] % CtbSizeY is not equal to 0 and xCtbC+x−PpsVirtualBoundariesPosX[n]/SubWidthC is greater than or equal to 0 and less than 2 for any n=0 . . . pps_num_ver_virtual_boundaries−1, the following applies:

$$h_{x+i}=\text{Clip3}(\text{PpsVirtualBoundariesPos}X[n]/\text{SubWidth}C,\text{pic\_width\_in\_luma\_samples}/\text{SubWidth}C-1,x\text{Ctb}C+x+i) \quad (8\text{-}1280)$$

Otherwise, if pps_loop_filter_across_virtual_boundaries_disabled_flag is equal to 1, and PpsVirtualBoundariesPosX[n] % CtbSizeY is not equal to 0 and PpsVirtualBoundariesPosX[n]/SubWidthC−xCtbC−x is greater than 0 and less than 3 for any n=0 . . . pps_num_ver_virtual_boundaries−1, the following applies:

$$h_{x+i}=\text{Clip3}(0,\text{PpsVirtualBoundariesPos}X[n]/\text{SubWidth}C-1,x\text{Ctb}C+x+i) \quad (8\text{-}1281)$$

Otherwise, the following applies:

$$h_{x+i}=\text{Clip3}(0,\text{pic\_width\_in\_luma\_samples}/\text{SubWidth}C-1,x\text{Ctb}C+x+i) \quad (8\text{-}1282)$$

If subpic_treated_as_pic_flag[SubPicIdx] is equal to 1, the top boundary of the current coding tree block is the top boundary of the sub-picture, and y is greater than 0 and less than 2, the following applies:

$$v_{y+j}=\text{Clip3}(y\text{Ctb}C,\text{pic\_height\_in\_luma\_samples}/\text{SubHeight}C-1,y\text{Ctb}C/\text{SubHeight}C+y+j)$$

Otherwise, if subpic_treated_as_pic_flag[SubPicIdx] is equal to 1, the bottom boundary of the current coding tree block is the bottom boundary of the sub-picture, and y is greater than CtbSizeY−3, the following applies:

$$v_{y+j}=\text{Clip3}(0,y\text{Ctb}C+\text{CtbSize}Y/\text{SubHeight}C-1,y\text{Ctb}C+y+j)$$

Otherwise, if pps_loop_filter_across_virtual_boundaries_disabled_flag is equal to 1, and PpsVirtualBoundariesPosY[n] % CtbSizeY is not equal to 0 and yCtbC+y−PpsVirtualBoundariesPosY[n]/SubHeightC is greater than or equal to 0 and less than 2 for any n=0 . . . pps_num_hor_virtual_boundaries−1, the following applies:

$$v_{y+j}=\text{Clip3}(\text{PpsVirtualBoundariesPos}Y[n]/\text{SubHeight}C,\text{pic\_height\_in\_luma\_samples}/\text{SubHeight}C-1,y\text{Ctb}C+y+j) \quad (8\text{-}1283)$$

Otherwise, if pps_loop_filter_across_virtual_boundaries_disabled_flag is equal to 1, and PpsVirtualBoundariesPosY[n] % CtbSizeY is not equal to 0 and PpsVirtualBoundariesPosY[n]/SubHeightC−yCtbC−y is greater than 0 and less than 3 for any n=0 . . . pps_num_hor_virtual_boundaries−1, the following applies:

$v_{y+j}$=Clip3(0,PpsVirtualBoundariesPosY[n]/SubHeight$C$−1,$y$Ctb$C$+$y$+$j$)  (8-1284)

Otherwise, the following applies:

$v_{y+j}$=Clip3(0,pic_height_in_luma_samples/SubHeight$C$−1,$y$Ctb$C$+$y$+$j$)  (8-1285)

Modified 8.8.5.5 ALF Boundary Position Derivation Process
Inputs of this process are:
  a luma location (xCtb, yCtb) specifying the top-left sample of the current luma coding tree block relative to the top left sample of the current picture,
  a luma location (x,y) specifying the current sample relative to the top-left sample of the current luma coding tree block.
Output of this process are:
  the left vertical boundary position clipLeftPos,
  the right vertical boundary position clipRightPos,
  the above horizontal boundary position clipTopPos,
  the below horizontal boundary position clipBottomPos.
The variables clipLeftPos, clipRightPos, clipTopPos and clipBottomPos are set equal to −128.
The variable clipTopPos is modified as follows:
  If the bottom boundary of the current coding tree block is not the bottom boundary of the picture, the bottom boundary of the current coding tree block is not the bottom boundary of the sub-picture, and y−(CtbSizeY−4) is greater than or equal to 0, the variable clipTopPos is set equal to yCtb+CtbSizeY−4.
  Otherwise, if the bottom boundary of the current coding tree block is the bottom boundary of the sub-picture with subpic_treated_as_pic_flag[SubPicIdx] equal to 0, and y−(CtbSizeY−4) is greater than or equal to 0, the variable clipTopPos is set equal to yCtb+CtbSizeY−4.
  Otherwise, if pps_loop_filter_across_virtual_boundaries_disabled_flag is equal to 1, and PpsVirtualBoundariesPosY[n] % CtbSizeY is equal to 0, and yCtb+y−PpsVirtualBoundariesPosY[n] is greater than or equal to 0 and less than 3 for any n=0 . . . pps_num_hor_virtual_boundaries−1, the following applies:

clipTopPos=PpsVirtualBoundariesPos$Y$[$n$]  (8-1292)

Otherwise, if y is less than 3, and the top boundary of the current coding tree block is not the top boundary of the picture, and one or more of the following conditions are true, the variable clipTopPos is set equal to yCtb:
    If the top boundary of the current coding tree block is the top boundary of the brick, and loop_filter_across_bricks_enabled_flag is equal to 0.
    If the top boundary of the current coding tree block is the top boundary of the slice, and loop_filter_across_slices_enabled_flag is equal to 0.
    If the top boundary of the current coding tree block is the top boundary of the sub-picture, subpic_treated_as_pic_flag[SubPicIdx] is equal to 0, and loop_filter_across_subpic_enabled_flag[SubPicIdx] is equal to 0.
The variable clipBottomPos is modified as follows:
  If the bottom boundary of the current coding tree block is not the bottom boundary of the picture, the bottom boundary of the current coding tree block is not the bottom boundary of the sub-picture, and CtbSizeY−4−y is greater than 0 and is less than 4, the variable clipBottomPos is set equal to yCtb+CtbSizeY−4.
  Otherwise, if the bottom boundary of the current coding tree block is the bottom boundary of the sub-picture with subpic_treated_as_pic_flag[SubPicIdx] equal to 0 and CtbSizeY−4−y is greater than 0 and is less than 4, the variable clipBottomPos is set equal to yCtb+CtbSizeY−4.
  Otherwise, if pps_loop_filter_across_virtual_boundaries_disabled_flag is equal to 1, PpsVirtualBoundariesPosY[n] % CtbSizeY is equal to 0, PpsVirtualBoundariesPosY[n] is not equal to pic_height_in_luma_samples−1 or 0, and PpsVirtualBoundariesPosY[n]−yCtb−y is greater than 0 and less than 4 for any n=0 . . . pps_num_hor_virtual_boundaries−1, the following applies:

clipBottomPos=PpsVirtualBoundariesPos$Y$[$n$]  (8-1293)

Otherwise, if CtbSizeY−y is less than 4, and the bottom boundary of the current coding tree block is not the bottom boundary of the picture, and one or more of the following conditions are true, the variable clipBottomPos is set equal to yCtb+CtbSizeY:
    If the bottom boundary of the current coding tree block is the bottom boundary of the brick, and loop_filter_across_bricks_enabled_flag is equal to 0.
    If the bottom boundary of the current coding tree block is the bottom boundary of the slice, and loop_filter_across_slices_enabled_flag is equal to 0.
    If the bottom boundary of the current coding tree block is the bottom boundary of the sub-picture, subpic_treated_as_pic_flag[SubPicIdx] is equal to 0, and loop_filter_across_subpic_enabled_flag[SubPicIdx] is equal to 0.
The variable clipLeftPos is modified as follows:
  If pps_loop_filter_across_virtual_boundaries_disabled_flag is equal to 1, and PpsVirtualBoundariesPosX[n] % CtbSizeY is equal to 0, and xCtb+x−PpsVirtualBoundariesPosX[n] is greater than or equal to 0 and less than 3 for any n=0 . . . pps_num_ver_virtual_boundaries−1, the following applies:

clipLeftPos=PpsVirtualBoundariesPos$X$[$n$]  (8-1294)

Otherwise, if x is less than 3, the left boundary of the current coding tree block is not the left boundary of the picture, and one or more of the following conditions are true, the variable clipLeftPos is set equal to xCtb:
    If the left boundary of the current coding tree block is the left boundary of the brick, and loop_filter_across_bricks_enabled_flag is equal to 0.
    If the left boundary of the current coding tree block is the left boundary of the slice, and loop_filter_across_slices_enabled_flag is equal to 0.
    If the left boundary of the current coding tree block is the left boundary of the sub-picture, subpic_treated_as_pic_flag[SubPicIdx] is equal to 0, and loop_filter_across_subpic_enabled_flag[SubPicIdx] is equal to 0.
The variable clipRightPos is modified as follows:
  If pps_loop_filter_across_virtual_boundaries_disabled_flag is equal to 1, and PpsVirtualBoundariesPosX[n] % CtbSizeY is equal to 0, and PpsVirtualBoundariesPosX[n]−xCtb−x is greater than 0 and less than 4 for any n=0 . . . pps_num_ver_virtual_boundaries−1, the following applies:

clipRightPos=PpsVirtualBoundariesPos$X$[$n$]  (8-1295)

Otherwise, if CtbSizeY−x is less than 4, and the right boundary of the current coding tree block is not the right boundary of the picture, and one or more of the following conditions are true, the variable clipRightPos is set equal to xCtb+CtbSizeY:

If the right boundary of the current coding tree block is the right boundary of the brick, and loop_filter_across_bricks_enabled_flag is equal to 0.

If the right boundary of the current coding tree block is the right boundary of the slice, and loop_filter_across_slices_enabled_flag is equal to 0.

if the right boundary of the current coding tree block is the right boundary of the sub-picture, subpic_treated_as_pic_flag[SubPicIdx] is equal to 0, and loop_filter_across_subpic_enabled_flag[SubPicIdx] is equal to 0.

Figure 5:
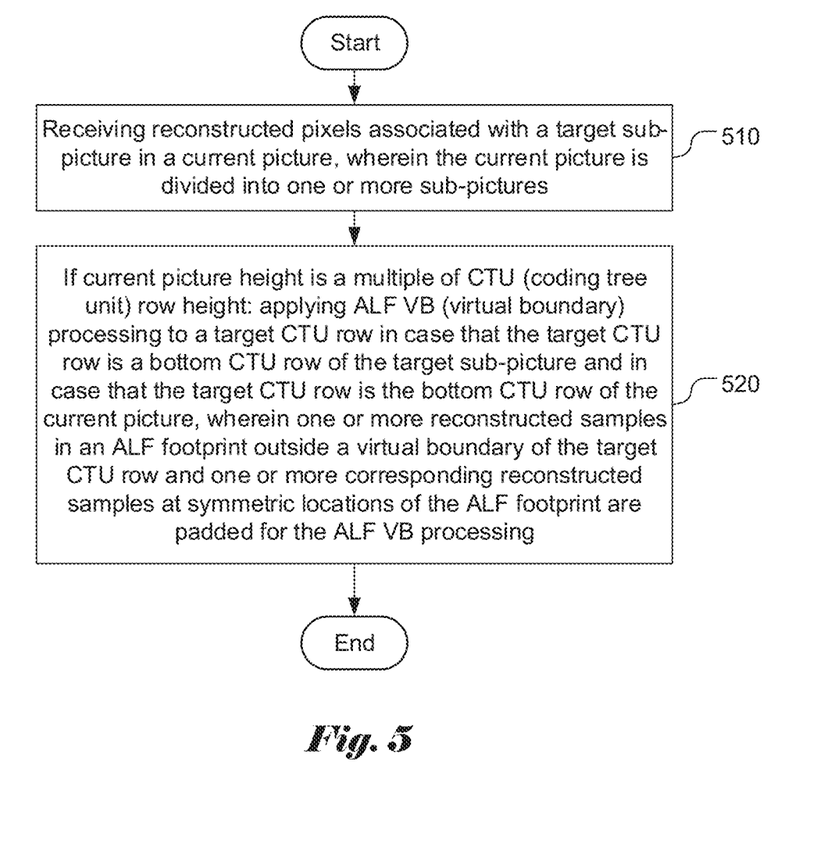
FIG. 5 illustrates a flowchart of an exemplary video coding according to an embodiment of the present invention, where the ALF virtual boundary processing is always applied to the bottom CTU row.

FIG. 5 illustrates a flowchart of an exemplary video coding according to an embodiment of the present invention, where the ALF virtual boundary processing is always applied to the bottom CTU row. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, reconstructed pixels associated with a target sub-picture in a current picture are received in step 510, wherein the current picture is divided into one or more sub-pictures. In step 520, if current picture height is a multiple of CTU (coding tree unit) row height: ALF VB (virtual boundary) processing is applied to a target CTU row in case that the target CTU row is a bottom CTU row of the target sub-picture and in case that the target CTU row is the bottom CTU row of the current picture, wherein one or more reconstructed samples in an ALF footprint outside a virtual boundary of the target CTU row and one or more corresponding reconstructed samples at symmetric locations of the ALF footprint are padded for the ALF VB processing.

Figure 6:
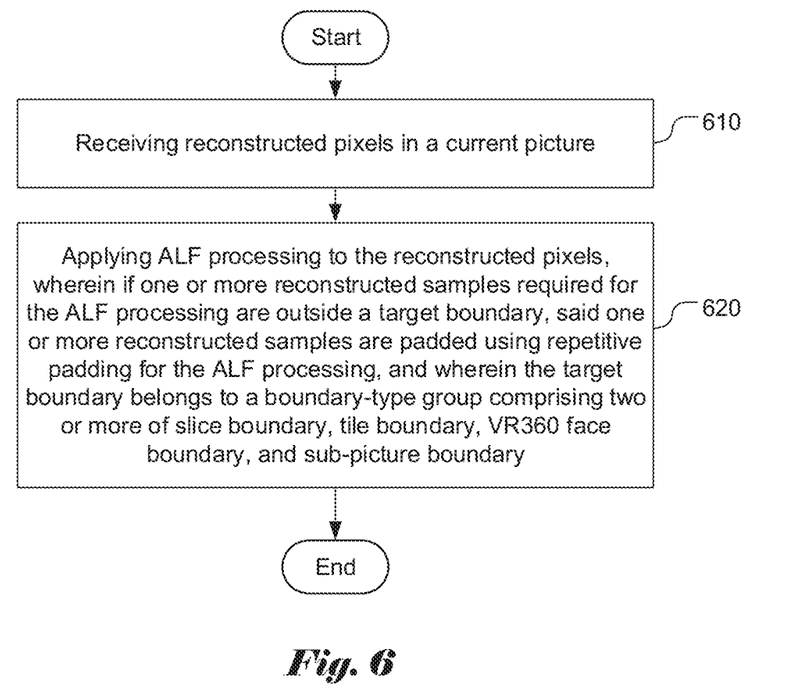
FIG. 6 illustrates a flowchart of an exemplary video coding according to an embodiment of the present invention, where the ALF padding process is unified for different boundary types.

FIG. 6 illustrates a flowchart of an exemplary video coding according to an embodiment of the present invention, where the ALF padding process is unified for different boundary types. According to this method, reconstructed pixels in a current picture are received in step 610. In step 620, ALF processing is applied to the reconstructed pixels, wherein if one or more reconstructed samples required for the ALF processing are outside a target boundary, said one or more reconstructed samples are padded using repetitive padding for the ALF processing, and wherein the target boundary belongs to a boundary-type group comprising two or more of slice boundary, tile boundary, VR360 face boundary, and sub-picture boundary.

Figure 7:
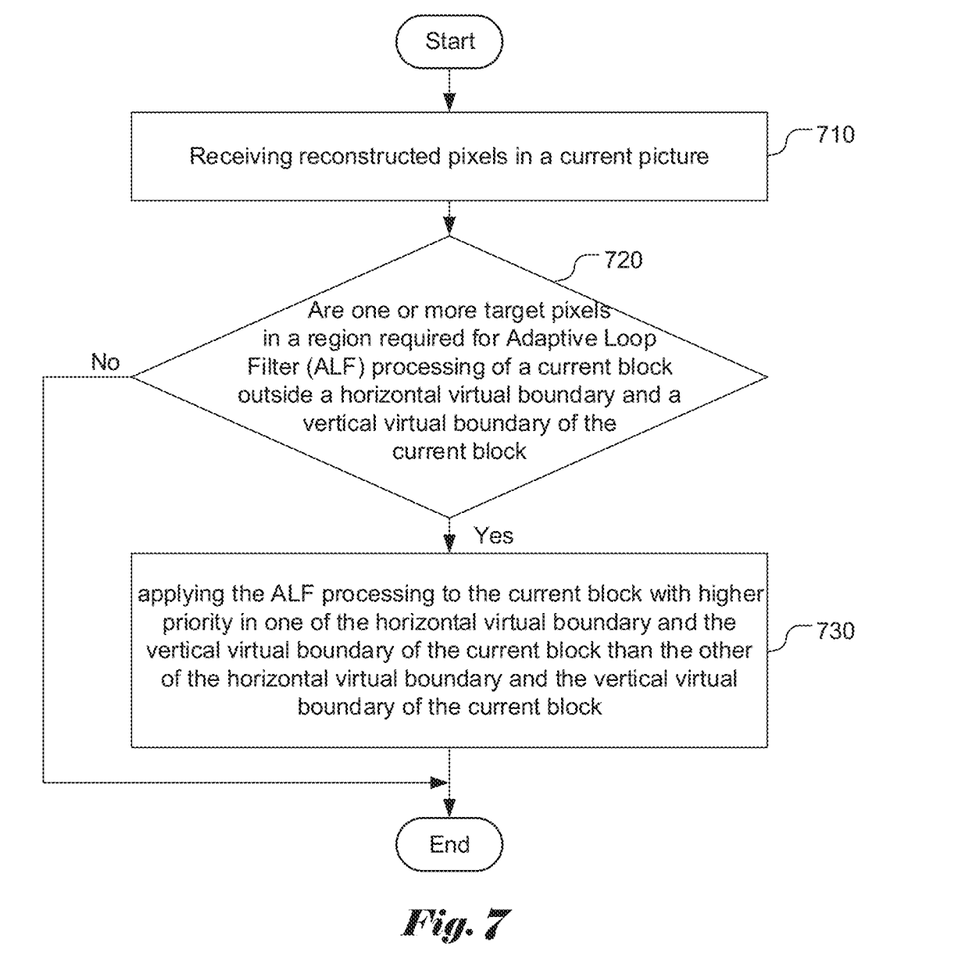
FIG. 7 illustrates a flowchart of an exemplary video coding according to an embodiment of the present invention, where the ALF VB processing has a fixed priority for a corner region that both horizontal and vertical virtual boundary processes can be applied.

FIG. 7 illustrates a flowchart of an exemplary video coding according to an embodiment of the present invention, where the ALF VB processing has a fixed priority for a corner region that both horizontal and vertical virtual boundary processes can be applied. According to this method, reconstructed pixels in a current picture are received in step 710. Whether one or more target pixels in a region required for Adaptive Loop Filter (ALF) processing of a current block are outside a horizontal virtual boundary and a vertical virtual boundary of the current block is checked in step 720. If said one or more target pixels in the region required for the ALF processing of the current block are outside the horizontal virtual boundary and the vertical virtual boundary of the current block (i.e., the "Yes" path from step 720), step 730 is performed. Otherwise (i.e., the "No" path from step 720), step 730 is skipped. In step 730, the ALF processing is applied to the current block with higher priority in one of the horizontal virtual boundary and the vertical virtual boundary of the current block than the other of the horizontal virtual boundary and the vertical virtual boundary of the current block.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for video coding, the method comprising:
receiving reconstructed pixels in a current picture associated with a target sub-picture in a current picture, wherein the current picture is divided into one or more sub-pictures, wherein when one sample for an adaptive loop filter (ALF) filter position is at one side of a virtual boundary of a target coding tree unit (CTU) row, adaptive loop filter virtual boundary (ALF VB) processing is performed to make one corresponding sample at the other side of the virtual boundary for the ALF filter position be replaced with a padded sample;
when a current picture height is a multiple of CTU row height: applying ALF VB processing to the target CTU row in case that the target CTU row is a bottom CTU row of the target sub-picture; and
when a current picture height is a multiple of CTU row height: applying ALF VB processing to the target CTU row in case that the target CTU row is a bottom CTU row of the current picture.

2. The method for video coding according to claim 1, wherein repetitive padding applied to horizontal boundaries is accorded a higher priority than repetitive padding applied to vertical boundaries, in situations where both can be applied.

3. The method of claim 1, wherein at least one of said one sample for an ALF filter position is at one side of the virtual boundary and said one corresponding sample at the other side of the virtual boundary for the ALF filter position is unavailable when the ALF VB processing is performed.

4. An apparatus for video coding, the apparatus comprising one or more electronic circuits or processors arranged to:
receive reconstructed pixels in a current picture associated with a target sub-picture in a current picture, wherein the current picture is divided into one or more sub-pictures, wherein when one sample for an adaptive loop filter (ALF) filter position is at one side of a virtual boundary of a target coding tree unit (CTU) row, adaptive loop filter virtual boundary (ALF VB) processing is performed to make one corresponding sample at the other side of the virtual boundary for the ALF filter position be replaced with a padded sample;
when a current picture height is a multiple of CTU row height: apply ALF VB processing to the target CTU row in case that the target CTU row is a bottom CTU row of the target sub-picture; and
when a current picture height is a multiple of CTU row height: apply ALF VB processing to the target CTU row in case that the target CTU row is a bottom CTU row of the current picture.

5. The apparatus for video coding according to claim 4, wherein repetitive padding applied to horizontal boundaries is accorded a higher priority than repetitive padding applied to vertical boundaries, in situations where both can be applied.

* * * * *